US012719140B2

(12) United States Patent
Liu et al.

(10) Patent No.: US 12,719,140 B2
(45) Date of Patent: Aug. 25, 2026

(54) PHASE SHIFTING APPARATUS AND ANTENNA

(71) Applicant: BOE TECHNOLOGY GROUP CO., LTD., Beijing (CN)

(72) Inventors: Jianxing Liu, Beijing (CN); Jia Fang, Beijing (CN); Shiyu Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 322 days.

(21) Appl. No.: 18/696,674

(22) PCT Filed: Mar. 29, 2023

(86) PCT No.: PCT/CN2023/084564
§ 371 (c)(1),
(2) Date: Mar. 28, 2024

(87) PCT Pub. No.: WO2024/197616
PCT Pub. Date: Oct. 3, 2024

(65) Prior Publication Data
US 2026/0142359 A1 May 21, 2026

(51) Int. Cl.
*H01P 1/18* (2006.01)
*H01Q 3/36* (2006.01)

(52) U.S. Cl.
CPC *H01P 1/18* (2013.01); *H01Q 3/36* (2013.01)

(58) Field of Classification Search
CPC .................................. H01P 1/18; H01Q 3/36
USPC ........................................................ 342/371
See application file for complete search history.

(56) References Cited

U.S. PATENT DOCUMENTS

2016/0294054 A1* 10/2016 Behdad .................... H01Q 3/36
2021/0367336 A1 11/2021 Jia et al.
2025/0007157 A1* 1/2025 Wang ....................... H01Q 3/36
2026/0088478 A1* 3/2026 Grävendieck ........... H01P 1/184

FOREIGN PATENT DOCUMENTS

CN 1499670 A 5/2004
CN 207517872 U * 6/2018
CN 109244679 A 1/2019
CN 110137636 A 8/2019

(Continued)

*Primary Examiner* — Harry K Liu
(74) *Attorney, Agent, or Firm* — HOUTTEMAN LAW LLC

(57) ABSTRACT

A phase shifting apparatus includes N phase shifters; where N≥2 and N is an integer. Each phase shifter includes a first dielectric substrate, a second dielectric substrate, a tunable dielectric layer, a first electrode layer, and a second electrode layer. The first dielectric substrate and the second dielectric substrate are opposite to each other, the tunable dielectric layer is between the first dielectric substrate and the second dielectric substrate, the first electrode layer is on a side of the first dielectric substrate close to the tunable dielectric layer, and the second electrode layer is on a side of the second dielectric substrate close to the tunable dielectric layer. The N phase shifters are sequentially stacked, and orthographic projections of regions defined by first electrode layers and second electrode layers of at least two of the N phase shifters on a plane where the first dielectric substrate is located are overlapped.

20 Claims, 4 Drawing Sheets

(56) References Cited

FOREIGN PATENT DOCUMENTS

| | | | | | |
|---|---|---|---|---|---|
| CN | 209248207 | U | | 8/2019 | |
| CN | 112490645 | A | | 3/2021 | |
| CN | 112490672 | A | | 3/2021 | |
| CN | 113656929 | A | * | 11/2021 | ........... H01Q 15/002 |
| CN | 115693130 | A | | 2/2023 | |
| JP | 2011044774 | A | | 3/2011 | |
| TW | 202131090 | A | * | 8/2021 | ............... G03F 1/26 |
| WO | WO2021168735 | A1 | | 9/2021 | |

* cited by examiner

PHASE SHIFTING APPARATUS AND ANTENNA

CROSS-REFERENCE TO RELATED APPLICATION

This is a National Phase Application filed under 35 U.S.C. 371 as a national stage of PCT/CN2023/084564, filed on Mar. 29, 2023, the content of which is hereby incorporated by reference in its entirety.

TECHNICAL FIELD

The present disclosure belongs to the field of communication technology, and specifically relates to a phase shifting apparatus and an antenna.

BACKGROUND

To meet the requirements of the 5G era on the signal transmission speed and the transmission content breadth, a current mainstream scheme involves transmitting and receiving signals between communication devices by an antenna delivering electromagnetic wave signals. The antenna is an array antenna that changes beam pointing in the pattern by controlling a feeding phase of radiating elements in the array antenna. A main object of the phased array is to implement spatial scanning of array beams, i.e., the so-called electrical scanning. As an important component of the antenna, the phase shifter changes the phase consistency of the antenna assembly to improve a power synthesis efficiency of the antenna assembly and a synthesis efficiency of echo signals, thereby implementing beam switching/scanning and improving the capacity of the communication system. The phase shifters currently used mainly include mechanical phase shifters and electronic phase shifters. The mechanical phase shifter cannot change the phase quickly in a very short time limited by the inertia, and has relatively large volume and heavy mass. The electronic phase shifter, although overcoming the defects of the mechanical phase shifter, involves high cost, has relatively complex design and poor intermodulation performance, and cannot perform continuous phase modulation. A liquid crystal phase shifter can change a dielectric constant of the liquid crystal material by loading a voltage on upper and lower substrates containing liquid crystal therebetween to form an overlap capacitance, so that a phase constant of electromagnetic waves in the device is changed, and finally the effect of adjusting a phase shift amount is achieved and beam scanning of the antenna device is implemented.

SUMMARY

To solve at least one of the problems in the existing art, the present disclosure provides a phase shifting apparatus and an antenna.

In a first aspect, an embodiment of the present disclosure provides a phase shifting apparatus, including N phase shifters, where N≥2 and N is an integer; wherein each phase shifter includes a first dielectric substrate, a second dielectric substrate, a tunable dielectric layer, a first electrode layer, and a second electrode layer; the first dielectric substrate and the second dielectric substrate are opposite to each other, the tunable dielectric layer is between the first dielectric substrate and the second dielectric substrate, the first electrode layer is on a side of the first dielectric substrate close to the tunable dielectric layer, and the second electrode layer is on a side of the second dielectric substrate close to the tunable dielectric layer; wherein the N phase shifters are sequentially stacked, and orthographic projections of regions defined by first electrode layers and second electrode layers of at least two of the N phase shifters on a plane where the first dielectric substrate is located are overlapped.

The second dielectric substrate of an $i^{th}$ phase shifter is connected to the first dielectric substrate of an $(i+1)^{th}$ phase shifter by an adhesive layer; where i is selected from 1 to (N−1), and i is an integer.

The first electrode layer of each phase shifter is independently connected to a first signal line extending through the first dielectric substrate of the phase shifter; the first signal line electrically connected to the first electrode layer of a $j^{th}$ phase shifter is electrically connected to a first transfer electrode, where j is selected from 2 to N, and j is an integer; and the first transfer electrode electrically connected to the $j^{th}$ phase shifter includes (j−1) first transfer sub-electrodes electrically connected in sequence, and the (j−1) first transfer sub-electrodes are arranged in one-to-one correspondence with the first to $(j-1)^{th}$ phase shifters; each first transfer sub-electrode corresponding to one of the phase shifters includes a first transfer part, a second transfer part, and a third transfer part electrically connecting the first transfer part and the second transfer part; and the first transfer part extends through the first dielectric substrate, the second transfer part extends through the second dielectric substrate, and the third transfer part is between the first dielectric substrate and the second dielectric substrate.

The first signal line electrically connected to the $j^{th}$ phase shifter is electrically connected to the first transfer electrode via a second transfer electrode; and the second transfer electrode electrically connected to the $j^{th}$ phase shifter is between the first dielectric substrate of the $j^{th}$ phase shifter and the second dielectric substrate of the $(j-1)^{th}$ phase shifter.

The second transfer electrode is a conductive adhesive or a metal member.

An orthographic projection of the third transfer part on the plane where the first dielectric substrate is located covers orthographic projections of the first transfer part and the second transfer part on the plane where the first dielectric substrate is located.

The second dielectric substrate of an $i^{th}$ phase shifter (N−1) also serves as the first dielectric substrate of an $(i+1)^{th}$ phase shifter; where i is selected from 1 to (N−1), and i is an integer.

The first electrode layer of each phase shifter is independently connected to a first signal line extending through the first dielectric substrate of the phase shifter; the first signal line electrically connected to the first electrode layer of a $j^{th}$ phase shifter is electrically connected to a first transfer electrode, where j is selected from 2 to N, and j is an integer; and the first transfer electrode electrically connected to the $j^{th}$ phase shifter includes (j−1) first transfer sub-electrodes electrically connected in sequence, and the (j−1) first transfer sub-electrodes are arranged in one-to-one correspondence with the first to $(j-1)^{th}$ phase shifters; each first transfer sub-electrode corresponding to one of the phase shifters includes a first transfer part and a third transfer part, wherein the first transfer part extends through the first dielectric substrate, and the third transfer part is between the first dielectric substrate and the second dielectric substrate.

An orthographic projection of the third transfer part of each first transfer sub-electrode on the plane where the first dielectric substrate is located covers an orthographic projection of the first transfer part on the plane where the first dielectric substrate is located.

The second dielectric substrate of an $i^{th}$ phase shifter also serves as the first dielectric substrate of an $(i+1)^{th}$ phase shifter; where i is selected from 1 to (N−1), and i is an integer.

The first electrode layer of each phase shifter is independently connected to a first signal line through a third transfer electrode, and for the third transfer electrode and the first signal line connected to the first electrode layer of each phase shifter, the third transfer electrode is between the first dielectric substrate and the second dielectric substrate, and the first signal line extends through the second dielectric substrate;

- the first signal line electrically connected to the first electrode layer of a $j^{th}$ phase shifter is electrically connected to a first transfer electrode, where j is selected from 2 to N, and j is an integer; and
- the first transfer electrode electrically connected to the $j^{th}$ phase shifter includes (j−1) first transfer sub-electrodes electrically connected in sequence, and the (j−1) first transfer sub-electrodes are arranged in one-to-one correspondence with the first to $(j-1)^{th}$ phase shifters; each first transfer sub-electrode corresponding to one of the phase shifters includes a second transfer part and a third transfer part, wherein the second transfer part extends through the second dielectric substrate, and the third transfer part is between the first dielectric substrate and the second dielectric substrate.

An orthographic projection of the third transfer part of each first transfer sub-electrode on the plane where the first dielectric substrate is located covers an orthographic projection of the second transfer part on the plane where the first dielectric substrate is located.

Two phase shifters are provided and share the same second dielectric substrate.

The first signal line electrically connected to the first electrode layer of a first phase shifter extends through the first dielectric substrate of the first phase shifter; the first signal line electrically connected to the first electrode layer of a second phase shifter extends through the second dielectric substrate of the second phase shifter, and the first electrode layer of the second phase shifter is electrically connected to the first signal line through a third transfer electrode between the first dielectric substrate and the second dielectric substrate of the second phase shifter; and the first signal line electrically connected to the first electrode layer of the second phase shifter is further electrically connected to a first transfer electrode, wherein the first transfer electrode includes a third transfer part and a first transfer part, the third transfer part is between the first dielectric substrate and the second dielectric substrate of the first phase shifter, and the first transfer part extends through the first dielectric substrate of the first phase shifter.

An orthographic projection of the third transfer part of the first transfer electrode on the plane where the first dielectric substrate is located covers an orthographic projection of the first transfer part on the plane where the first dielectric substrate is located.

Each phase shifter further includes a first protective layer between the first dielectric substrate and the first electrode layer, and/or a second protective layer between the second dielectric substrate and the second electrode layer.

The first electrode layer includes a transmission line, and the second electrode layer includes a patch electrode.

The first dielectric substrate and the second dielectric substrate each include a glass substrate.

The tunable dielectric layer includes a liquid crystal layer.

In a second aspect, an embodiment of the present disclosure provides an antenna, including any one phase shifting apparatus as described above.

DETAIL DESCRIPTION OF EMBODIMENTS

To improve understanding of the technical solution of the present disclosure for one of ordinary skill in the art, the present disclosure will be described in detail with reference to accompanying drawings and specific implementations.

Unless otherwise defined, technical or scientific terms used in the present disclosure are intended to have general meanings as understood by one of ordinary skill in the art to which the present disclosure belongs. The words “first”, “second” and similar terms used in the present disclosure do not denote any order, quantity, or importance, but are used merely for distinguishing different components from each other. Also, the words “a”, “an”, or “the” and similar referents do not denote a limitation of quantity, but rather denote the presence of at least one. The word “comprising” or “including” or the like means that the element or item preceding the word contains elements or items that appear after the word or equivalents thereof, but does not exclude other elements or items. The words “connected” or “coupled” and the like are not restricted to physical or mechanical connections, but may include electrical connections, whether direct or indirect. The words “upper”, “lower”, “left”, “right”, and the like are merely used to indicate a relative positional relationship, and when an absolute position of the described object is changed, the relative positional relationship may be changed accordingly.

The phase shifting apparatus provided in the embodiments of the present disclosure includes N phase shifters; where N≥2 and N is an integer. Each phase shifter may be a liquid crystal phase shifter, that is, a phase shifter with a tunable dielectric layer therein being a liquid crystal layer. However, it should be understood that in the embodiments of the present disclosure, the tunable dielectric layer in the phase shifter being a liquid crystal layer is merely taken as an example for illustration, instead of limiting the scope of the embodiments of the present disclosure.

Figure 1:
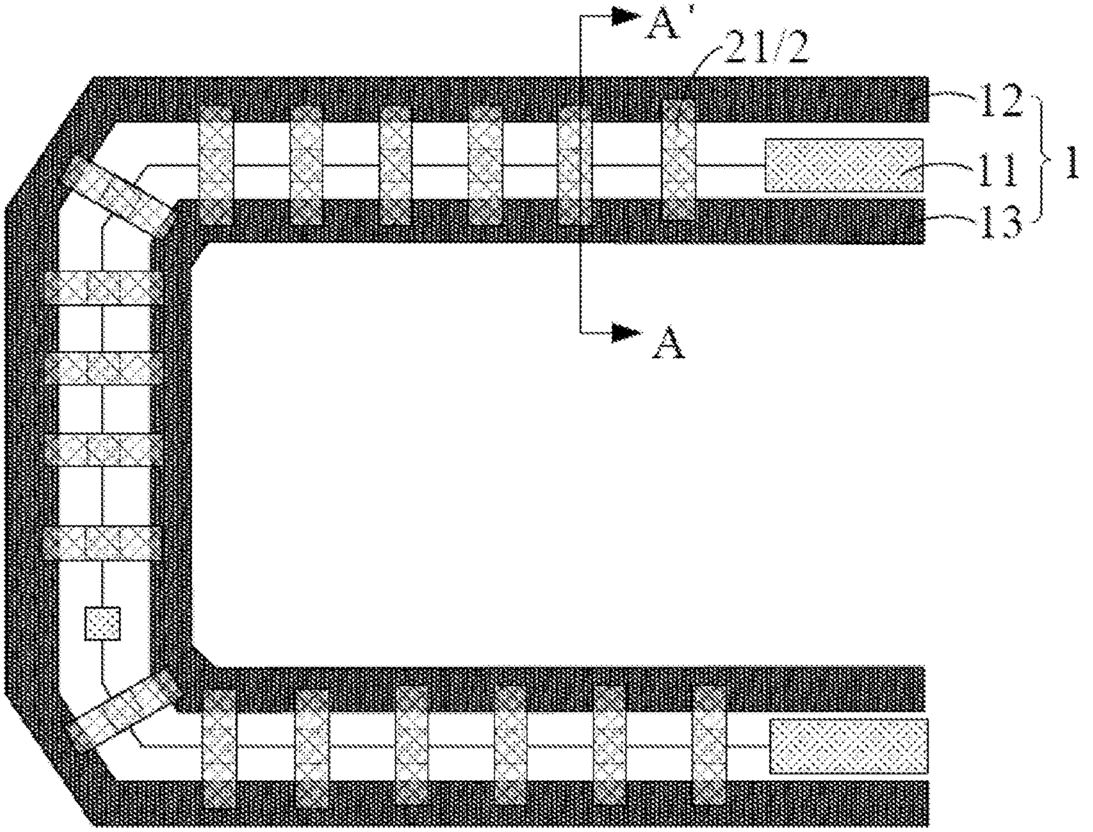
FIG. 1 is a top view of an exemplary liquid crystal phase shifter.
Figure 2:
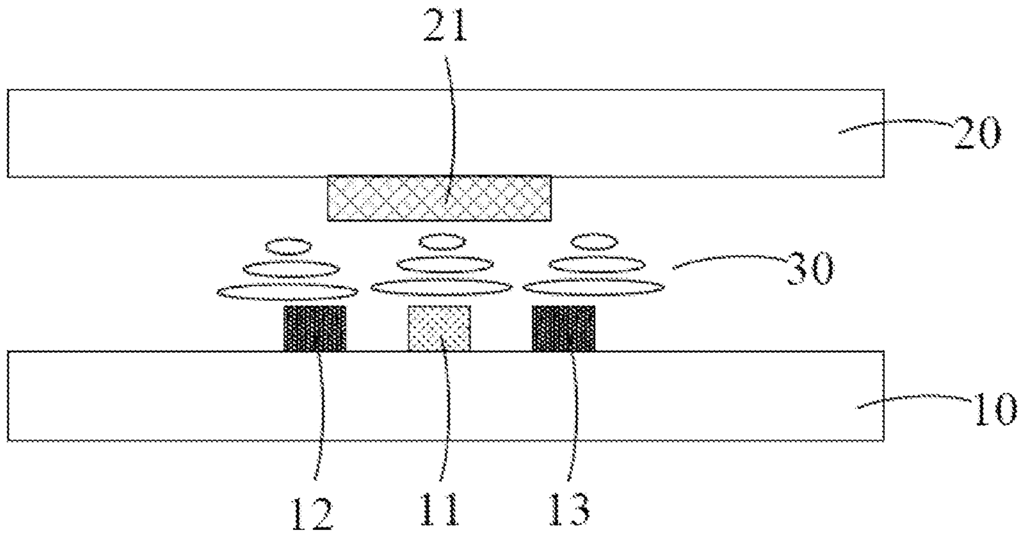
FIG. 2 is a sectional view taken along A-A' in FIG. 1.

FIG. 1 is a top view of an exemplary liquid crystal phase shifter; and FIG. 2 is a sectional view taken along A-A' in FIG. 1. As shown in FIG. 2, the liquid crystal phase shifter is a U-shaped liquid crystal phase shifter including a first dielectric substrate 10 and a second dielectric substrate 20 disposed opposite to each other, a liquid crystal layer 30 between the first dielectric substrate 10 and the second dielectric substrate 20, a first electrode layer 1 on a side of the first dielectric substrate 10 close to the second dielectric substrate 20, and a second electrode layer 2 on a side of the second dielectric substrate 20 close to the first dielectric substrate 10. The first electrode layer 1 is a coplanar waveguide (CPW) transmission line, and includes a first reference electrode 12, a second reference electrode 13, and a signal electrode 11 between the first reference electrode 12 and the second reference electrode 13. The second electrode layer 2 includes a plurality of patch electrodes 21, each of which has an orthographic projection on the first dielectric substrate 10 crossing an orthographic projection of the signal electrode 11 on the first dielectric substrate 10, and overlapped with orthographic projections of the first reference electrode 12 and the second reference electrode layer 13 on the first dielectric substrate 10.

The inventors have found that, in the existing art, the phase shifters in the phase shifting apparatus are arranged in the same horizontal plane, occupying a large area, resulting a large size of the phase shifting apparatus, and making it hard to achieve miniaturization of the antenna.

In view of the above technical problem, an embodiment of the present disclosure provides a phase shifting apparatus, including N phase shifters; where N≥2 and N is an integer. Each phase shifter includes a first dielectric substrate, a second dielectric substrate, a tunable dielectric layer, a first electrode layer, and a second electrode layer. The first dielectric substrate and the second dielectric substrate are disposed opposite to each other, the tunable dielectric layer is located between the first dielectric substrate and the second dielectric substrate, the first electrode layer is disposed on a side of the first dielectric substrate close to the tunable dielectric layer, and the second electrode layer is disposed on a side of the second dielectric substrate close to the tunable dielectric layer. The N phase shifters are sequentially stacked, and orthographic projections of regions defined by first electrode layers and second electrode layers of at least two of the N phase shifters on a plane where the first dielectric substrate is located are overlapped.

In the phase shifting apparatus in the embodiments of the present disclosure, the N phase shifters are sequentially stacked from bottom to top, and orthographic projections of regions defined by first electrode layers and second electrode layers of at least two of the phase shifters on the plane where the first dielectric substrate is located are overlapped, so that the size of the phase shifting apparatus can be effectively reduced, which is beneficial to realizing miniaturization of the antenna.

In some examples, the first electrode layer in the embodiments of the present disclosure may be a transmission line, for example, the CPW transmission line as described above, and the second electrode layer may include a plurality of patch electrodes. In the embodiments of the present disclosure, the case where the first electrode layer is a transmission line, and the second electrode layer is a patch electrode is merely taken as an example for illustration.

In some examples, the tunable dielectric layer in the embodiments of the present disclosure includes, but is not limited to, a liquid crystal layer, and the tunable dielectric layer being a liquid crystal layer is merely taken as an example for illustration in the embodiments of the present disclosure.

In some examples, the first dielectric substrate and the second dielectric substrate include, but are not limited to, glass substrates, and the case where the first dielectric substrate and the second dielectric substrate are both glass substrates is merely taken as an example for illustration in the embodiments of the present disclosure.

In some examples, where N phase shifters are sequentially arranged from bottom to top, the first dielectric substrate of each phase shifter is used as a lower substrate, and the second dielectric substrate is used as an upper substrate, and in this case, the second dielectric substrate of an $i^{th}$ phase shifter is connected to the first dielectric substrate of an $(i+1)^{th}$ phase shifter by an adhesive layer; where i is selected from 1 to (N−1), and i is an integer. For example: the second dielectric substrate of a first phase shifter is connected to the first dielectric substrate of a second phase shifter by an adhesive layer.

Furthermore, the first electrode layer of each phase shifter is independently connected to a first signal line extending through the first dielectric substrate of the phase shifter. The first signal line electrically connected to the first electrode layer of a $j^{th}$ phase shifter is electrically connected to a first transfer electrode, where j is selected from 2 to N, and j is an integer. The first transfer electrode electrically connected to the $j^{th}$ phase shifter includes (j−1) first transfer sub-electrodes electrically connected in sequence, and the (j−1) first transfer sub-electrodes are arranged in one-to-one correspondence with the first to $(j-1)^{th}$ phase shifters. Each first transfer sub-electrode corresponding to one of the phase shifters includes a first transfer part, a second transfer part, and a third transfer part electrically connecting the first transfer part and the second transfer part. The first transfer part extends through the first dielectric substrate, the second transfer part extends through the second dielectric substrate, and the third transfer part is located between the first dielectric substrate and the second dielectric substrate. In other words, except for the first phase shifter, the first signal line electrically connected to the first electrode layer of each of the remaining phase shifters extends to a position below the first phase shifter through the corresponding first transfer electrode, so that a microwave signal is loaded onto the first signal line by the feed network.

Furthermore, for each of the first transfer sub-electrodes, an orthographic projection of the third transfer part therein on the plane where the first dielectric substrate is located covers orthographic projections of the first transfer part and the second transfer part on the plane where the first dielectric substrate is located. In this manner, the stable connection between first transfer part and second transfer part can be guaranteed.

Furthermore, the first signal line electrically connected to the $j^{th}$ phase shifter is electrically connected to the first transfer electrode via a second transfer electrode; and the second transfer electrode electrically connected to the $j^{th}$ phase shifter is located between the first dielectric substrate of the $j^{th}$ phase shifter and the second dielectric substrate of the $(j-1)^{th}$ phase shifter. The reason for such arrangement is that if the first signal line is directly electrically connected to the corresponding first transfer electrode, an alignment deviation may occur and cause unstable connection between the two, while the first signal line and the corresponding first transfer electrode connected via the second transfer electrode are ensured to have stable connection therebetween. The second transfer electrode may be a conductive adhesive or a metal connection member. It should be noted that a width of the second transfer electrode is much larger than line widths of the first signal line and the first transfer electrode.

In some examples, where N phase shifters are sequentially arranged from bottom to top, the first dielectric substrate of each phase shifter is used as a lower substrate, and the second dielectric substrate is used as an upper substrate, and in this case, the second dielectric substrate of an $i^{th}$ phase shifter also serves as the first dielectric substrate of an $(i+1)^{th}$ phase shifter; where i is selected from 1 to (N−1), and i is an integer. In this manner, the structure of the phase shifting apparatus can be further thinner and lighter.

Furthermore, the first electrode layer of each phase shifter is independently connected to a first signal line extending through the first dielectric substrate of the phase shifter. The first signal line electrically connected to the first electrode layer of a $j^{th}$ phase shifter is electrically connected to a first transfer electrode, where j is selected from 2 to N, and j is an integer. The first transfer electrode electrically connected to the $j^{th}$ phase shifter includes (j−1) first transfer sub-electrodes electrically connected in sequence, and the (j−1) first transfer sub-electrodes are arranged in one-to-one correspondence with the first to $(j-1)^{th}$ phase shifters. Each first transfer sub-electrode corresponding to one of the phase shifters includes a first transfer part and a third transfer part. The first transfer part extends through the first dielectric substrate, and the third transfer part is located between the first dielectric substrate and the second dielectric substrate. In other words, except for the first phase shifter, the first signal line electrically connected to the first electrode layer of each of the remaining phase shifters extends to a position below the first phase shifter through the corresponding first transfer electrode, so that a microwave signal is loaded onto the first signal line by the feed network.

Furthermore, for each of the first transfer sub-electrodes, an orthographic projection of the third transfer part therein on the plane where the first dielectric substrate is located covers an orthographic projection of the first transfer part on the plane where the first dielectric substrate is located. In this manner, the stable connection between the first transfer part and the first signal line, and the stable connection between the respective first transfer parts, are guaranteed.

In some examples, where N phase shifters are sequentially arranged from bottom to top, the first dielectric substrate of each phase shifter is used as an upper substrate, and the second dielectric substrate is used as a lower substrate, and in this case, the second dielectric substrate of an $i^{th}$ phase shifter also serves as the first dielectric substrate of an $(i+1)^{th}$ phase shifter; where i is selected from 1 to (N−1), and i is an integer. In this case, the structure of the phase shifting apparatus also can be further thinner and lighter.

Furthermore, the first electrode layer of each phase shifter is independently connected to a first signal line through a third transfer electrode, and for the third transfer electrode and the first signal line connected to the first electrode layer of each phase shifter, the third transfer electrode is located between the first dielectric substrate and the second dielectric substrate, and the first signal line extends through the second dielectric substrate. The first signal line electrically connected to the first electrode layer of a $j^{th}$ phase shifter is electrically connected to a first transfer electrode, where j is selected from 2 to N, and j is an integer. The first transfer electrode electrically connected to the $j^{th}$ phase shifter includes (j−1) first transfer sub-electrodes electrically connected in sequence, and the (j−1) first transfer sub-electrodes are arranged in one-to-one correspondence with the first to $(j-1)^{th}$ phase shifters. Each first transfer sub-electrode corresponding to one of the phase shifters includes a second transfer part and a third transfer part. The second transfer part extends through the second dielectric substrate, and the third transfer part is located between the first dielectric substrate and the second dielectric substrate. In other words, except for the first phase shifter, the first signal line electrically connected to the first electrode layer of each of the remaining phase shifters extends to a position below the first phase shifter through the corresponding first transfer electrode, so that a microwave signal is loaded onto the first signal line by the feed network.

Furthermore, for each of the first transfer sub-electrodes, an orthographic projection of the third transfer part therein on the plane where the first dielectric substrate is located covers an orthographic projection of the second transfer part on the plane where the first dielectric substrate is located. In this manner, the stable connection between the second transfer part and the first signal line, and the stable connection between the respective second transfer parts, are guaranteed.

In some examples, where the phase shifting apparatus includes only two phase shifters, the two phase shifters share the same second dielectric substrate. In this case, the structure of the phase shifting apparatus can be further thinner and lighter.

Furthermore, the first signal line electrically connected to the first electrode layer of a first phase shifter extends through the first dielectric substrate of the first phase shifter. The first signal line electrically connected to the first electrode layer of a second phase shifter extends through the second dielectric substrate of the second phase shifter, and the first electrode layer of the second phase shifter is electrically connected to the first signal line through a third transfer electrode between the first dielectric substrate and the second dielectric substrate of the phase shifter. The first signal line electrically connected to the first electrode layer of a second phase shifter is further electrically connected to a first transfer electrode. The first transfer electrode includes a third transfer part and a first transfer part, the third transfer part is located between the first dielectric substrate and the second dielectric substrate of the first phase shifter, and the first transfer part extends through the first dielectric substrate of the first phase shifter. In other words, the first signal line electrically connected to the first electrode layer of the second phase shifter extends to a position below the first phase shifter through the first transfer electrode, so that a microwave signal is loaded onto the first signal line by the feed network.

The following is illustrated with specific examples. For convenience of description, the phase shifting apparatus according to the embodiments of the present disclosure is described below merely taking the case where two or three phase shifters are provided in the phase shifting apparatus, i.e., N is 2 or 3, as an example, and in combination with the relationship between the first dielectric substrates and the second dielectric substrates of the phase shifters.

Figure 3:
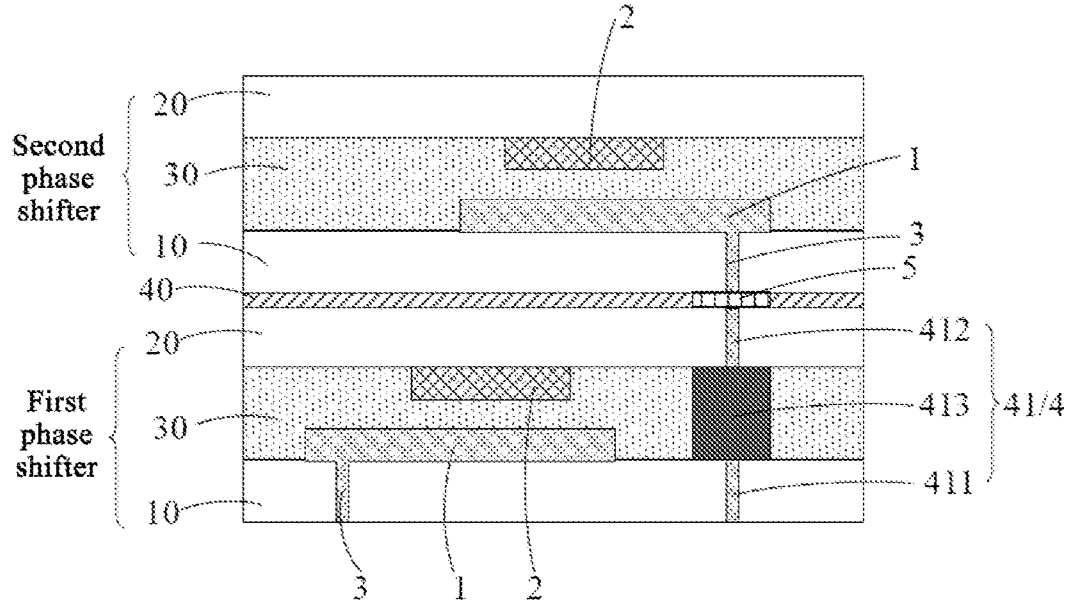
FIG. 3 is a sectional view of a phase shifting apparatus in a first example according to an embodiment of the present disclosure.

First example: FIG. 3 is a sectional view of a phase shifting apparatus in a first example according to an embodiment of the present disclosure. As shown in FIG. 3, the phase shifting apparatus includes two phase shifters, the lower phase shifter in FIG. 3 is taken as a first phase shifter, and the upper phase shifter is taken as a second phase shifter. The first phase shifter and the second phase shifter each include a first dielectric substrate 10 and a second dielectric substrate 20 disposed opposite to each other, a liquid crystal layer 30 between the first dielectric substrate 10 and the second dielectric substrate 20, a first electrode layer 1 on a side of the first dielectric substrate 10 close to the second dielectric substrate 20, and a second electrode layer 2 on a side of the second dielectric substrate 20 close to the first dielectric substrate 10. The second dielectric substrate 20 of the first phase shifter is connected to the first dielectric substrate 10 of the second phase shifter by an adhesive layer 40. The first electrode layer 1 of the first phase shifter is electrically connected to a first signal line 3 extending through the first dielectric substrate 10 of the first phase shifter, and the first electrode layer 1 of the second phase shifter is electrically connected to a first signal line 3 extending through the first dielectric substrate 10 of the second phase shifter. That is, the first signal lines 3 are connected to the first electrode layers 1 in one-to-one correspondence. Since no other film layer is provided below the first dielectric substrate 10 of the first phase shifter, the first signal line 3 electrically connected to the first electrode layer 1 of the first phase shifter may be connected to a feed network. Further, since the first signal line 3 electrically connected to the second phase shifter only extends through the first dielectric substrate 10 of the second phase shifter, and the first phase shifter is further disposed below the first dielectric substrate 10 of the second phase shifter, the first signal line 3 of the second phase shifter in the embodiment of the present disclosure has to be electrically connected to a first transfer electrode 4, and then electrically connected to the feed network below the first phase shifter through the first transfer electrode 4. The first transfer electrode 4 includes only one first transfer sub-electrode 41, which includes a first transfer part 411, a second transfer part 412, and a third transfer part 413. The first transfer part 411 extends through the first dielectric substrate 10 of the first phase shifter, the second transfer part 412 extends through the second dielectric substrate 20 of the first phase shifter, and the third transfer part 413 is located between the first dielectric substrate 10 and the second dielectric substrate 20 of the first phase shifter, and electrically connects the first transfer part 411 and the second transfer part 412. The second transfer part 412 of the first transfer electrode 4 is connected to the first signal line 3 electrically connected to the first electrode layer 1 of the second phase shifter via a second transfer electrode 5. The second transfer electrode 5 is located between the second dielectric substrate 20 of the first phase shifter and the first dielectric substrate 10 of the second phase shifter. The second transfer electrode 5 may be a conductive adhesive or a metal member.

In some examples, an orthographic projection of the third transfer part 413 of the first transfer sub-electrode 41 on the plane where the first dielectric substrate 10 is located covers orthographic projections of the first transfer part 411 and the second transfer part 412 on the plane where the first dielectric substrate 10 is located. In this manner, the stable connection between the first transfer part 411 and the second transfer part 412 is guaranteed by means of the third transfer part 413.

Figure 4:
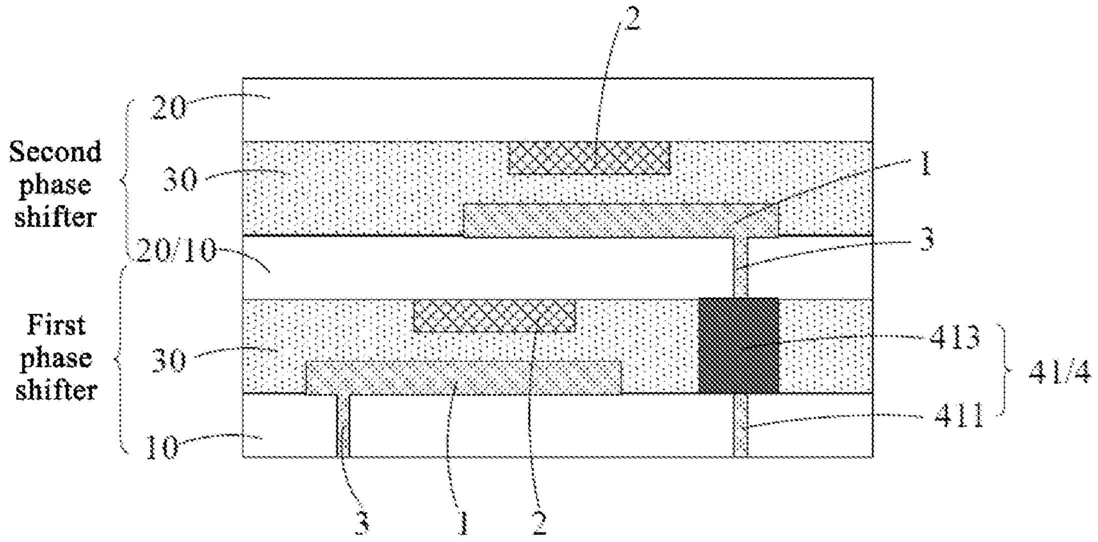
FIG. 4 is a sectional view of a phase shifting apparatus in a second example according to an embodiment of the present disclosure.

Second example: FIG. 4 is a sectional view of a phase shifting apparatus in a second example according to an embodiment of the present disclosure. As shown in FIG. 4, the phase shifting apparatus includes two phase shifters, the lower phase shifter in FIG. 4 is taken as a first phase shifter, and the upper phase shifter is taken as a second phase shifter. The first phase shifter and the second phase shifter each include a first dielectric substrate 10 and a second dielectric substrate 20 disposed opposite to each other, a liquid crystal layer 30 between the first dielectric substrate 10 and the second dielectric substrate 20, a first electrode layer 1 on a side of the first dielectric substrate 10 close to the second dielectric substrate 20, and a second electrode layer 2 on a side of the second dielectric substrate 20 close to the first dielectric substrate 10. The second dielectric substrate 20 of the first phase shifter also serves as the first dielectric substrate 10 of the second phase shifter, so that only three dielectric substrates are needed for the two phase shifters. The first electrode layer 1 of the first phase shifter is electrically connected to a first signal line 3 extending through the first dielectric substrate 10 of the first phase shifter, and the first electrode layer 1 of the second phase shifter is electrically connected to a first signal line 3 extending through the first dielectric substrate 10 of the second phase shifter. That is, the first signal lines 3 are connected to the first electrode layers 1 in one-to-one correspondence. Since no other film layer is provided below the first dielectric substrate 10 of the first phase shifter, the first signal line 3 electrically connected to the first electrode layer 1 of the first phase shifter may be connected to a feed network. Further, since the first signal line 3 electrically connected to the second phase shifter only extends through the first dielectric substrate 10 of the second phase shifter, and the first phase shifter is further disposed below the first dielectric substrate 10 of the second phase shifter, the first signal line 3 of the second phase shifter in the embodiment of the present disclosure has to be electrically connected to a first transfer electrode 4, and then electrically connected to the feed network below the first phase shifter through the first transfer electrode 4. The first transfer electrode 4 includes only one first transfer sub-electrode 41, which includes a first transfer part 411 and a third transfer part 413. The first transfer part 411 extends through the first dielectric substrate 10 of the first phase shifter, and the third transfer part 413 is located between the first dielectric substrate 10 and the second dielectric substrate 20 of the first phase shifter. The first transfer part 411 is connected to the third transfer part 413, and the third transfer part 413 is further connected to the first signal line 3 connected to the first electrode layer 1 of the second phase shifter. In this case, the first signal line 3 connected to the first electrode layer 1 of the second phase shifter extends to a position below the first dielectric substrate 10 of the first phase shifter, sequentially through the third transfer part and the first transfer part 411.

In some examples, an orthographic projection of the third transfer part 413 of the first transfer sub-electrode 41 on the plane where the first dielectric substrate 10 is located covers an orthographic projection of the first transfer part 411 on the plane where the first dielectric substrate 10 is located. In this manner, the first transfer part 411 can be stably connected to the first signal line 3 via the third transfer part 413.

Figure 5:
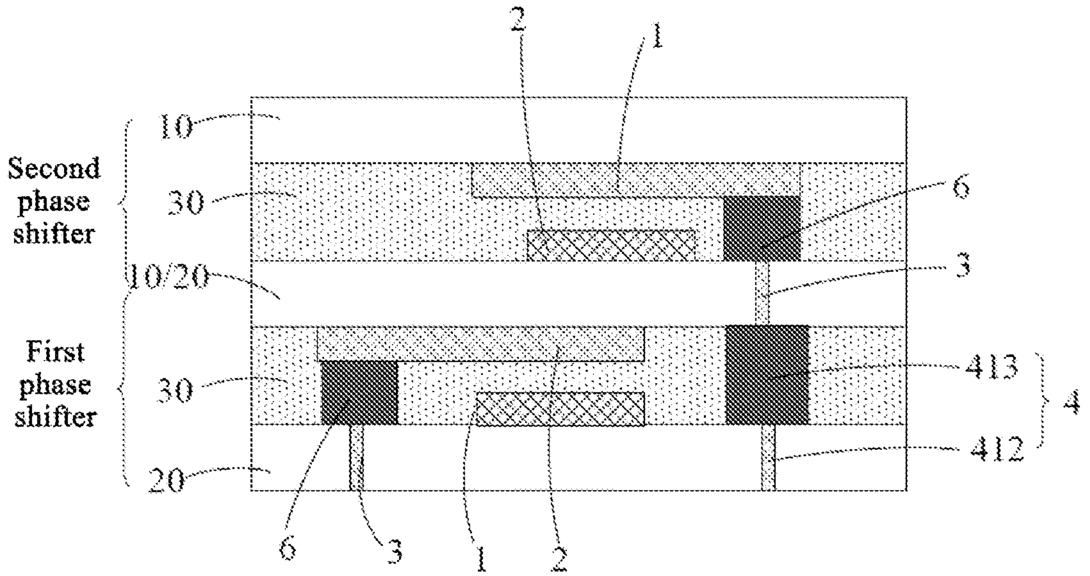
FIG. 5 is a sectional view of a phase shifting apparatus in a third example according to an embodiment of the present disclosure.

Third example: FIG. 5 is a sectional view of a phase shifting apparatus in a third example according to an embodiment of the present disclosure. As shown in FIG. 5, the phase shifting apparatus includes two phase shifters, the lower phase shifter in FIG. 5 is taken as a first phase shifter, and the upper phase shifter is taken as a second phase shifter. The first phase shifter and the second phase shifter each include a first dielectric substrate 10 and a second dielectric substrate 20 disposed opposite to each other, a liquid crystal layer 30 between the first dielectric substrate 10 and the second dielectric substrate 20, a first electrode layer 1 on a side of the first dielectric substrate 10 close to the second dielectric substrate 20, and a second electrode layer 2 on a side of the second dielectric substrate 20 close to the first dielectric substrate 10. The first dielectric substrate 10 of the first phase shifter also serves as the second dielectric substrate 20 of the second phase shifter, so that only three dielectric substrates are needed for the two phase shifters. The first electrode layer 1 of the first phase shifter is connected to a first signal line 3 via a third transfer electrode 6. The third transfer electrode 6 connected to the first electrode layer 1 of the first phase shifter is located between the first dielectric substrate 10 and the second dielectric substrate 20 of the first phase shifter, and the first signal line 3 electrically connected to the first electrode layer 1 of a first phase shifter extends through the second dielectric substrate 20 of the first phase shifter. The first electrode layer 1 of the first phase shifter is connected to the first signal line 3 via a third transfer electrode 6. A third transfer electrode 6 connected to the first electrode layer 1 of the second phase shifter is located between the first dielectric substrate 10 and the second dielectric substrate 20 of the second phase shifter, and the first signal line 3 electrically connected to the first electrode layer 1 of the second phase shifter extends through the second dielectric substrate 20 of the second phase shifter. Since no other film layer is provided below the second dielectric substrate 20 of the first phase shifter, the first signal line 3 electrically connected to the first electrode layer 1 of the first phase shifter may be connected to a feed network. Further, since the first signal line 3 electrically connected to the second phase shifter only extends through the first dielectric substrate 10 of the second phase shifter, and the first phase shifter is further disposed below the second dielectric substrate 20 of the second phase shifter, the first signal line 3 of the second phase shifter in the embodiment of the present disclosure has to be electrically connected to a first transfer electrode 4, and then electrically connected to the feed network below the first phase shifter through the first transfer electrode 4. The first transfer electrode 4 includes only one first transfer sub-electrode 41, which includes a second transfer part 412 and a third transfer part 413. The second transfer part 412 extends through the second dielectric substrate 20 of the first phase shifter, and the third transfer part 413 is located between the first dielectric substrate 10 and the second dielectric substrate 20 of the first phase shifter. In this manner, the first signal line 3 electrically connected to the first electrode layer 1 of the second phase shifter is connected to the third transfer part 413 which is further electrically connected to the second transfer part 412, so that the first signal line 3 extends to a position below the second dielectric layer of the first phase shifter, to be connected to the feed network.

In some examples, an orthographic projection of the third transfer part 413 of the first transfer sub-electrode 41 on the plane where the first dielectric substrate 10 is located covers an orthographic projection of the second transfer part 412 on the plane where the first dielectric substrate 10 is located. In this manner, the second transfer part 412 can be stably connected to the first signal line 3 via the third transfer part 413.

In some examples, an orthographic projection of the third transfer electrode 6 on the plane where the first dielectric substrate 10 is located covers an orthographic projection of the first signal line 3 electrically connected to the third transfer electrode 6 on the plane where the first dielectric substrate 10 is located, so as to ensure that the first electrode layer 1 and the first signal line 3 can be connected through the liquid crystal layer 30.

Figure 6:
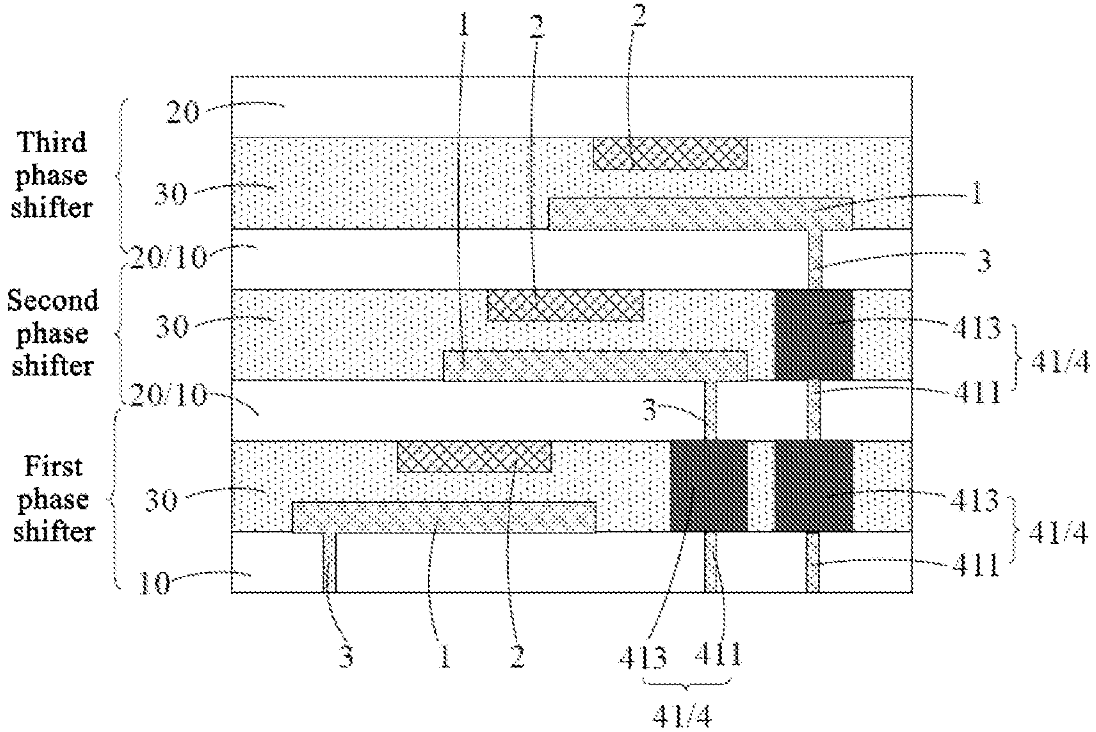
FIG. 6 is a sectional view of a phase shifting apparatus in a fourth example according to an embodiment of the present disclosure.

Fourth example: FIG. 6 is a sectional view of a phase shifting apparatus in a fourth example according to an embodiment of the present disclosure. As shown in FIG. 6, the phase shifting apparatus in this example has substantially the same structure as that of the second example, except that three phase shifters are included. In this case, the first dielectric substrate 10 of the third phase shifter also serves as the second dielectric substrate 20 of the second phase shifter. In this example, the first electrode layer 1 of the first phase shifter is electrically connected to a first signal line 3 extending through the first dielectric substrate 10 of the first phase shifter, and the first electrode layer 1 of the second phase shifter is electrically connected to a first signal line 3 extending through the first dielectric substrate 10 of the second phase shifter. That is, the first signal lines 3 are connected to the first electrode layers 1 in one-to-one correspondence. Since no other film layer is provided below the first dielectric substrate 10 of the first phase shifter, the first signal line 3 electrically connected to the first electrode layer 1 of the first phase shifter may be connected to a feed network. Further, since the first signal line 3 electrically connected to the second phase shifter only extends through the first dielectric substrate 10 of the second phase shifter, and the first phase shifter is further disposed below the first dielectric substrate 10 of the second phase shifter, the first signal line 3 of the second phase shifter in the embodiment of the present disclosure has to be electrically connected to a first transfer electrode 4, and then electrically connected to the feed network below the first phase shifter through the first transfer electrode 4. The first transfer electrode 4 includes only one first transfer sub-electrode 41, which includes a first transfer part 411 and a third transfer part 413. The first transfer part 411 extends through the first dielectric substrate 10 of the first phase shifter, and the third transfer part 413 is located between the first dielectric substrate 10 and the second dielectric substrate 20 of the first phase shifter. The first transfer part 411 is connected to the third transfer part 413, and the third transfer part 413 is further connected to the first signal line 3 connected to the first electrode layer 1 of the second phase shifter. In this case, the first signal line 3 connected to the first electrode layer 1 of the second phase shifter extends to a position below the first dielectric substrate 10 of the first phase shifter sequentially through the third transfer part and the first transfer part 411. Similarly, since the first signal line 3 electrically connected to the third phase shifter only extends through the first dielectric substrate 10 of the second phase shifter, and the first phase shifter and the second phase shifter are further disposed below the first dielectric substrate 10 of the third phase shifter, the first signal line 3 of the third phase shifter in the embodiment of the present disclosure has to be electrically connected to a first transfer electrode 4, and then electrically connected to the feed network below the first phase shifter through the first transfer electrode 4. The first transfer electrode 4 includes only two first transfer sub-electrodes 41, each of which includes a first transfer part 411 and a third transfer part 413. One of the first transfer sub-electrodes has the first transfer part 411 extending through the first dielectric substrate 10 of the first phase shifter, and the third transfer part 413 between the first dielectric substrate 10 and the second dielectric substrate 20 of the first phase shifter. The other of the first transfer sub-electrodes has the first transfer part 411 extending through the first dielectric substrate 10 of the second phase shifter, and the third transfer part 413 between the first dielectric substrate 10 and the second dielectric substrate 20 of the second phase shifter. The first transfer part 411 and the third transfer part 413 of each first transfer sub-electrode 41 are connected together, and the third transfer part 413 of the first transfer sub-electrode 41 corresponding to the second phase shifter is further connected to the first signal line 3 connected to the first electrode layer 1 of the second phase shifter. In this case, the first signal line 3 connected to the first electrode layer 1 of the third phase shifter extends to a position below the first dielectric substrate 10 of the first phase shifter, sequentially through the third transfer part and the first transfer part 411 of the second phase shifter, and the third transfer part and the first transfer part 411 of the first phase shifter.

Figure 7:
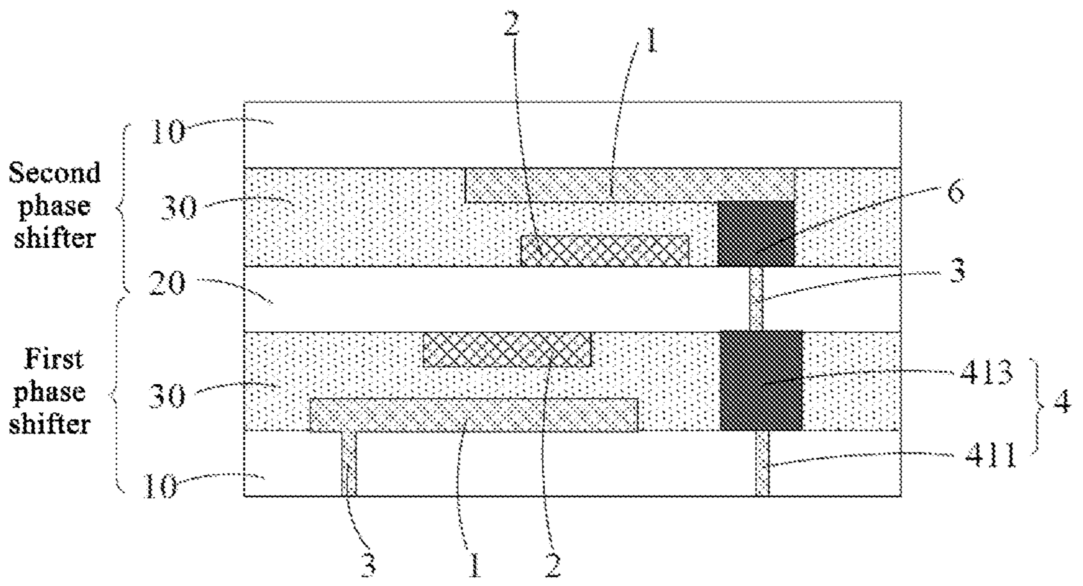
FIG. 7 is a sectional view of a phase shifting apparatus in a fifth example according to an embodiment of the present disclosure.

Fifth example: FIG. 7 is a sectional view of a phase shifting apparatus in a fifth example according to an embodiment of the present disclosure. As shown in FIG. 7, the phase shifting apparatus includes two phase shifters, the lower phase shifter in FIG. 7 is taken as a first phase shifter, and the upper phase shifter is taken as a second phase shifter. The first phase shifter and the second phase shifter each include a first dielectric substrate 10 and a second dielectric substrate 20 disposed opposite to each other, a liquid crystal layer 30 between the first dielectric substrate 10 and the second dielectric substrate 20, a first electrode layer 1 on a side of the first dielectric substrate 10 close to the second dielectric substrate 20, and a second electrode layer 2 on a side of the second dielectric substrate 20 close to the first dielectric substrate 10. The second dielectric substrate 20 of the first phase shifter also serves as the second dielectric substrate 20 of the second phase shifter. The first electrode layer 1 of the first phase shifter is electrically connected to a first signal line 3 extending through the first dielectric substrate 10 of the first phase shifter. The first electrode layer 1 of the second phase shifter is electrically connected to a first signal line 3 through a third transfer electrode 6. The third transfer electrode 6 is located between the first dielectric substrate 10 and the second dielectric substrate 20 of the second phase shifter. The first signal line 3 electrically connected to the second phase shifter extends through the second dielectric substrate 20 of the second phase shifter. Since no other film layer is provided below the first dielectric substrate 10 of the first phase shifter, the first signal line 3 electrically connected to the first electrode layer 1 of the first phase shifter may be connected to a feed network. Further, since the first signal line 3 electrically connected to the second phase shifter only extends through the second dielectric substrate 20 of the second phase shifter, and the first phase shifter is further disposed below the second dielectric substrate 20 of the second phase shifter, the first signal line 3 of the second phase shifter in the embodiment of the present disclosure has to be electrically connected to a first transfer electrode 4, and then electrically connected to the feed network below the first phase shifter through the first transfer electrode 4. The first transfer electrode 4 includes a third transfer part 413 and a first transfer part 411. The third transfer part 413 is located between the first dielectric substrate 10 and the second dielectric substrate 20 of the first phase shifter, and the first transfer part 411 extends through the first dielectric substrate 10 of the first phase shifter. In this manner, the first signal line 3 connected to the first electrode layer 1 of the second phase shifter extends to a position below the first dielectric substrate 10 of the first phase shifter through the third transfer part 413 and the first transfer part 411, to be electrically connected to the feed network.

In some examples, an orthographic projection of the third transfer electrode 6 on the plane where the first dielectric substrate 10 is located covers an orthographic projection of the first signal line 3 electrically connected to the third transfer electrode 6 on the plane where the first dielectric substrate 10 is located, so as to ensure that the first electrode layer 1 and the first signal line 3 can be connected through the liquid crystal layer 30.

An orthographic projection of the third transfer part 413 of the first transfer electrode 4 covers an orthographic projection of the first transfer part 411, thereby ensuring the stable connection between the first signal line 3 and the first transfer part 411 by means of the third transfer part 413.

In some examples, no matter which of the above structures the phase shifting apparatus in the embodiments of the present disclosure adopts, if the first signal line 3 extends through the first dielectric substrate 10, a connection via can be formed in the first dielectric substrate 10 by punching a hole in the glass substrate, and then a conductive material is filled into the connection via to form the first signal line 3. Similarly, if the first signal line 3 extends through the second dielectric substrate 20, a connection via can be formed in the second dielectric substrate 20 by punching a hole in the glass substrate, and then a conductive material is filled into the connection via to form the first signal line 3. Similarly, for the first transfer part 411 extending through the first dielectric substrate 10, a connection via is formed in the first dielectric substrate 10 by punching a hole in the glass substrate, and then a conductive material is filled into the connection via to form the first transfer part 411. For the second transfer part 412 extending through the second dielectric substrate 20, a connection via is formed in the second dielectric substrate 20 by punching a hole in the glass substrate, and then a conductive material is filled into the connection via to form the second transfer part 412.

In some examples, no matter which of the above structures the phase shifting apparatus in the embodiments of the present disclosure adopts, a first protective layer may be formed between the first electrode layer 1 and the first dielectric substrate 10, and/or a second protective layer may be formed between the second electrode layer 2 and the second dielectric substrate 20. In particular, a second protective layer may be formed between the second electrode layer 2 and the second dielectric substrate 20, to protect the glass substrate during formation of the second electrode layer 2 by etching. The first protective layer and the second protective layer may both include silicon nitride.

An embodiment of the present disclosure further provides an antenna, including any phase shifting apparatus as described above. The antenna in the embodiments of the present disclosure may specifically include a common-aperture liquid crystal phased array antenna used at multiple operating frequencies.

In some examples, the antenna further includes a transceiver unit, a radio frequency transceiver, a signal amplifier, a power amplifier, and a filter unit. The antenna may be used as a transmitting antenna or a receiving antenna in a communication device. The transceiver unit may include a baseband and a receiving end. The baseband provides signals of at least one frequency band, for example, 2G signals, 3G signals, 4G signals, 5G signals, or the like, and transmits the signals of the at least one frequency band to the radio frequency transceiver. After being received by the antenna in the communication system, the signals may be processed by the filter unit, the power amplifier, the signal amplifier, and the radio frequency transceiver, and then transmitted to the receiving end in the transceiver unit. The receiving end may be, for example, an intelligent gateway, or the like.

Furthermore, the radio frequency transceiver is connected to the transceiver unit, and configured to modulate a signal sent from the transceiver unit, or demodulate a signal received by the antenna and transmit the demodulated signal to the transceiver unit. Specifically, the radio frequency transceiver may include a transmitting circuit, a receiving circuit, a modulation circuit, and a demodulation circuit.

After being received by the transmitting circuit, multiple types of signals provided by the baseband can be modulated by the modulation circuit and then transmitted to the antenna. Then, the antenna receives and transmits the signals to the receiving circuit of the radio frequency transceiver which further transmits the signals to the demodulation circuit, where the signals are demodulated by the demodulation circuit and then transmitted to the receiving end.

Furthermore, the radio frequency transceiver is connected to the signal amplifier and the power amplifier which are further connected to the filter unit, and the filter unit is connected to at least one antenna. In the process of transmitting signals by a communication system, the signal amplifier is configured to increase signal-to-noise ratio of signals output from the radio frequency transceiver, and then transmit the signals to the filter unit. The power amplifier is configured to amplify power of the signals output from the radio frequency transceiver, and then to transmit the signal to the filter unit. The filter unit may specifically include a duplexer and a filter circuit. The filter unit combines the signals output from the signal amplifier and the power amplifier, filters noise waves, and then transmits the signals to the antenna to be radiated. In the process of receiving signals by a communication system, after being received by the antenna, the signals are transmitted to the filter unit, where the signals received by the antenna are filtered to remove noise waves by the filter unit and then transmitted to the signal amplifier and the power amplifier. The signal amplifier increases a gain of the signals received by the antenna to increase a signal-to-noise ratio of the signals; while the power amplifier amplifies a power of the signals received by the antenna. After being processed by the power amplifier and the signal amplifier, the signals received by the antenna are transmitted to the radio frequency transceiver, and then to the transceiver unit.

In some examples, the signal amplifier may include various types of signal amplifiers, such as a low noise amplifier, which is not limited herein.

In some examples, the antenna provided in the embodiments of the present disclosure further includes a power management unit, which is connected to the power amplifier and provides a voltage for signal amplification for the power amplifier.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. A phase shifting apparatus, comprising N phase shifters, where N≥2 and N is an integer; wherein each phase shifter comprises a first dielectric substrate, a second dielectric substrate, a tunable dielectric layer, a first electrode layer, and a second electrode layer; the first dielectric substrate and the second dielectric substrate are opposite to each other, the tunable dielectric layer is between the first dielectric substrate and the second dielectric substrate, the first electrode layer is on a side of the first dielectric substrate close to the tunable dielectric layer, and the second electrode layer is on a side of the second dielectric substrate close to the tunable dielectric layer; wherein the N phase shifters are sequentially stacked, and orthographic projections of regions defined by first electrode layers and second electrode layers of at least two of the N phase shifters on a plane where the first dielectric substrate is located are overlapped.

2. The phase shifting apparatus according to claim 1, wherein for each of the N phase shifters, the first dielectric substrate, the first electrode layer, the tunable dielectric layer, the second electrode layer, and the second dielectric substrate are arranged sequentially along a stacking direction of the N phase shifters; and the second dielectric substrate of an $i^{th}$ phase shifter is connected to the first dielectric substrate of an $(i+1)^{th}$ phase shifter by an adhesive layer; where i is selected from 1 to (N−1), and i is an integer.

3. The phase shifting apparatus according to claim 2, wherein the first electrode layer of each phase shifter is independently connected to a first signal line extending through the first dielectric substrate of the phase shifter; the first signal line electrically connected to the first electrode layer of a $j^{th}$ phase shifter is electrically connected to a first transfer electrode, where j is selected from 2 to N, and j is an integer; and the first transfer electrode electrically connected to the $j^{th}$ phase shifter comprises (j−1) first transfer sub-electrodes electrically connected in sequence, and the (j−1) first transfer sub-electrodes are arranged in one-to-one correspondence with the first to $(j-1)^{th}$ phase shifters; each first transfer sub-electrode corresponding to one of the phase shifters comprises a first transfer part, a second transfer part, and a third transfer part electrically connecting the first transfer part and the second transfer part; and the first transfer part extends through the first dielectric substrate, the second transfer part extends through the second dielectric substrate, and the third transfer part is between the first dielectric substrate and the second dielectric substrate.

4. The phase shifting apparatus according to claim 3, wherein the first signal line electrically connected to the $j^{th}$ phase shifter is electrically connected to the first transfer electrode via a second transfer electrode; and the second transfer electrode electrically connected to the $j^{th}$ phase shifter is between the first dielectric substrate of the $j^{th}$ phase shifter and the second dielectric substrate of the $(j-1)^{th}$ phase shifter.

5. The phase shifting apparatus according to claim 4, wherein the second transfer electrode is a conductive adhesive or a metal member.

6. The phase shifting apparatus according to claim 3, wherein an orthographic projection of the third transfer part on the plane where the first dielectric substrate is located covers orthographic projections of the first transfer part and the second transfer part on the plane where the first dielectric substrate is located.

7. The phase shifting apparatus according to claim 1, wherein for each of the N phase shifters, the first dielectric substrate, the first electrode layer, the tunable dielectric layer, the second electrode layer, and the second dielectric substrate are arranged sequentially along a stacking direction of the N phase shifters; and the second dielectric substrate of an $i^{th}$ phase shifter also serves as the first dielectric substrate of an $(i+1)^{th}$ phase shifter; where i is selected from 1 to (N−1), and i is an integer.

8. The phase shifting apparatus according to claim 7, wherein the first electrode layer of each phase shifter is independently connected to a first signal line extending through the first dielectric substrate of the phase shifter; the first signal line electrically connected to the first electrode layer of a $j^{th}$ phase shifter is electrically connected to a first transfer electrode, where j is selected from 2 to N, and j is an integer; and the first transfer electrode electrically connected to the $j^{th}$ phase shifter comprises (j−1) first transfer sub-electrodes electrically connected in sequence, and the (j−1) first transfer sub-electrodes are arranged in one-to-one correspondence with the first to $(j-1)^{th}$ phase shifters; and each first transfer sub-electrode corresponding to one of the phase shifters comprises a first transfer part and a third transfer part, wherein the first transfer part extends through the first dielectric substrate, and the third transfer part is between the first dielectric substrate and the second dielectric substrate.

9. The phase shifting apparatus according to claim 8, wherein an orthographic projection of the third transfer part of each first transfer sub-electrode on the plane where the first dielectric substrate is located covers an orthographic projection of the first transfer part on the plane where the first dielectric substrate is located.

10. The phase shifting apparatus according to claim 1, wherein for each of the N phase shifters, the second dielectric substrate, the second electrode layer, the tunable dielectric layer, the first electrode layer, and the first dielectric substrate are arranged sequentially along a stacking direction of the N phase shifters; and the first dielectric substrate of an $i^{th}$ phase shifter also serves as the second dielectric substrate of an $(i+1)^{th}$ phase shifter; where i is selected from 1 to (N−1), and i is an integer.

11. The phase shifting apparatus according to claim 10, wherein the first electrode layer of each phase shifter is independently connected to a first signal line through a third transfer electrode, and for the third transfer electrode and the first signal line connected to the first electrode layer of each phase shifter, the third transfer electrode is between the first dielectric substrate and the second dielectric substrate, and the first signal line extends through the second dielectric substrate;

the first signal line electrically connected to the first electrode layer of a $j^{th}$ phase shifter is electrically connected to a first transfer electrode, where j is selected from 2 to N, and j is an integer; and the first transfer electrode electrically connected to the $j^{th}$ phase shifter comprises (j−1) first transfer sub-electrodes electrically connected in sequence, and the (j−1) first transfer sub-electrodes are arranged in one-to-one correspondence with the first to $(j-1)^{th}$ phase shifters; and each first transfer sub-electrode corresponding to one of the phase shifters comprises a second transfer part and a third transfer part, wherein the second transfer part extends through the second dielectric substrate, and the third transfer part is between the first dielectric substrate and the second dielectric substrate.

12. The phase shifting apparatus according to claim 11, wherein an orthographic projection of the third transfer part of each first transfer sub-electrode on the plane where the first dielectric substrate is located covers an orthographic projection of the second transfer part on the plane where the first dielectric substrate is located.

13. The phase shifting apparatus according to claim 1, wherein two phase shifters are provided and share the same second dielectric substrate.

14. The phase shifting apparatus according to claim 13, wherein a first signal line electrically connected to the first electrode layer of a first phase shifter extends through the first dielectric substrate of the first phase shifter; a first signal line electrically connected to the first electrode layer of a second phase shifter extends through the second dielectric substrate of the second phase shifter, and the first electrode layer of the second phase shifter is electrically connected to the first signal line through a third transfer electrode between the first dielectric substrate and the second dielectric substrate of the second phase shifter; and the first signal line electrically connected to the first electrode layer of the second phase shifter is further electrically connected to a first transfer electrode, wherein the first transfer electrode comprises a third transfer part and a first transfer part, the third transfer part is between the first dielectric substrate and the second dielectric substrate of the first phase shifter, and the first transfer part extends through the first dielectric substrate of the first phase shifter.

15. The phase shifting apparatus according to claim 14, wherein an orthographic projection of the third transfer part of the first transfer electrode on the plane where the first dielectric substrate is located covers an orthographic projection of the first transfer part on the plane where the first dielectric substrate is located.

16. The phase shifting apparatus according to claim 1, wherein each phase shifter further comprises a first protective layer between the first dielectric substrate and the first electrode layer, and/or a second protective layer between the second dielectric substrate and the second electrode layer.

17. The phase shifting apparatus according to claim 1, wherein the first electrode layer comprises a transmission line, and the second electrode layer comprises a patch electrode.

18. The phase shifting apparatus according to claim 1, wherein the first dielectric substrate and the second dielectric substrate each comprise a glass substrate.

19. The phase shifting apparatus according to claim 1, wherein the tunable dielectric layer comprises a liquid crystal layer.

20. An antenna, comprising the phase shifting apparatus according to claim 1.

* * * * *